July 28, 1959
A. MOTTU
2,896,462
CHANGE SPEED BOX OF THE PRESELECTION TYPE FOR MACHINE TOOLS
Filed Dec. 3, 1956
2 Sheets-Sheet 1
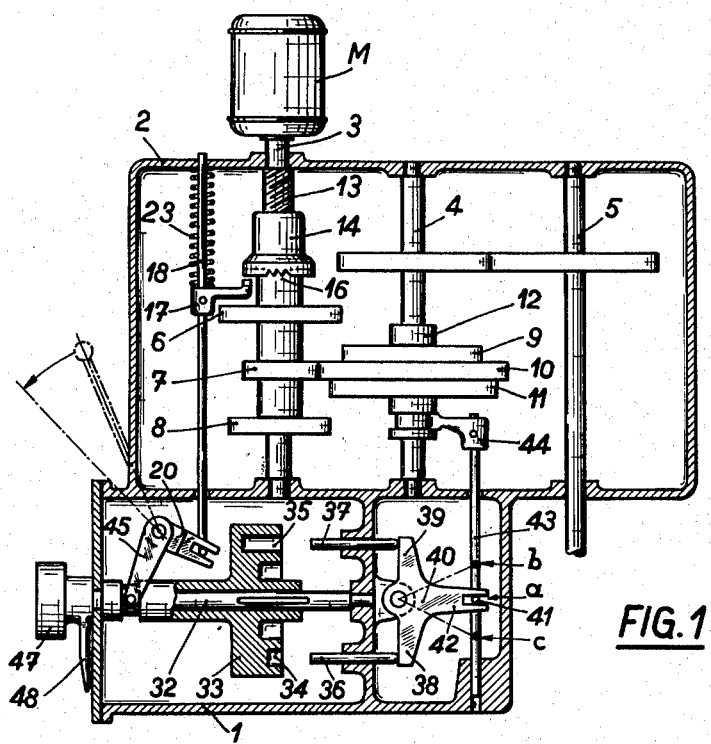
FIG.1
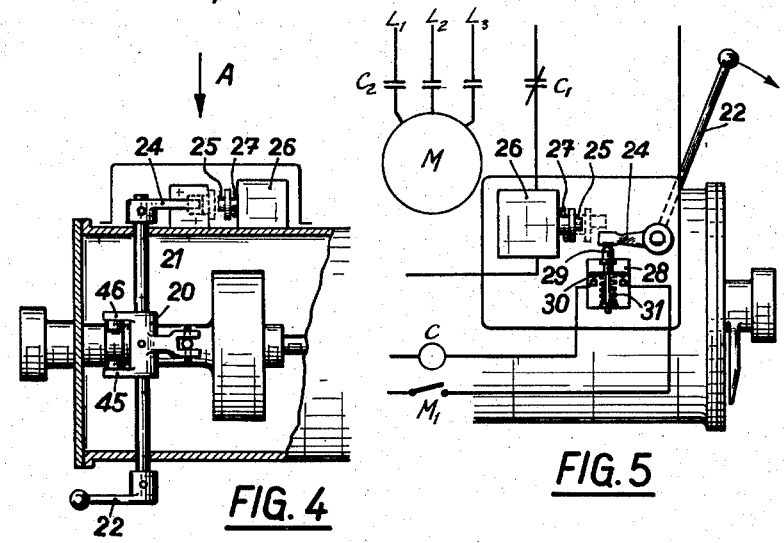
FIG. 4
FIG.5

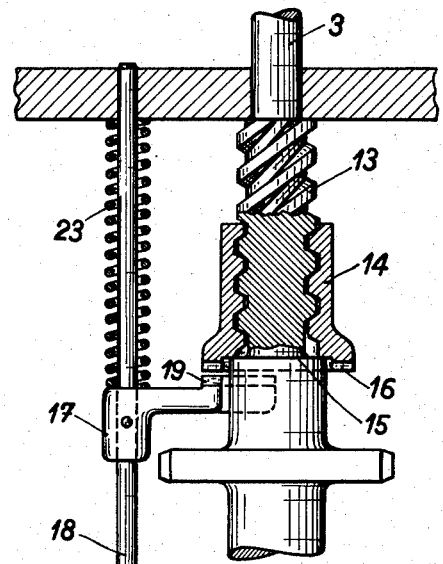
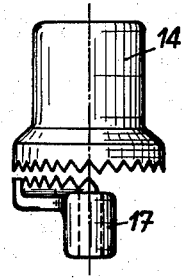
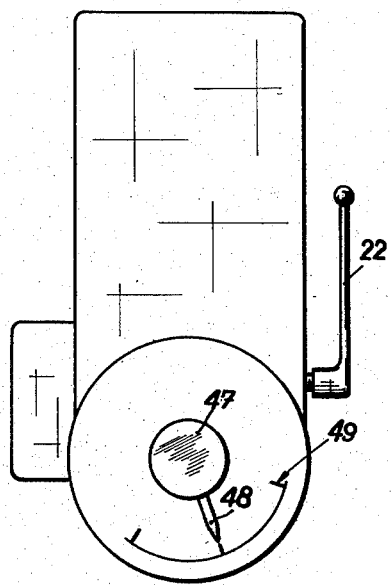

United States Patent Office 2,896,462
Patented July 28, 1959

2,896,462

CHANGE SPEED BOX OF THE PRESELECTION TYPE FOR MACHINE TOOLS

André Mottu, Geneva, Switzerland, assignor to Societe Genevoise d'Instruments de Physique, Geneva, Switzerland, a firm Application December 3, 1956, Serial No. 625,950

Claims priority, application Switzerland December 13, 1955

7 Claims. (Cl. 74—334)

In machine-tools provided with a change speed box, sliding gears are often used because they are less expensive and less fragile than the arrangements incorporating electro-magnetic or friction clutches. When shifting from one speed into another in such sliding gear systems, it is necesary to first stop or disconnect the driving motor so as to hold the wheels fast and to engage further toothed wheels with one another.

It may occur however that when in their final position the teeth of the wheels which are to engage abut against each other so that their interengagment can be obtained only by providing a slight rotation of one of the wheels with reference to the other.

Various mechanical or electric arrangements have been proposed for imparting to the control shaft, for instance, a slight rotation which is transmitted to the other shafts of the change speed box as the different gear wheels engage each other in succession.

In the case of a change speed box of the pre-selection type wherein the change of speed is operated through the shifting of a single lever, it is of advantage to resort to the movement of said lever for executing said rotation of the control shaft.

The present invention has for its object a mechanical arrangement for change speed boxes of the preselection type for use with a machine tool, said arrangement being adapted to impart to one of the shafts of the box a slight rotation furthering the interengagement between the toothed wheels whenever it is desired to pass from one speed into another.

According to the invention, this shaft to which a slight rotation is thus imparted is provided with a section having a high pitch thread cooperating with a nut while a driving member actuated by the lever controlling the change speed box acts on said nut so as to urge it axially in a predetermined direction while stopping its rotation so as to thus produce the rotation of the shaft considered.

The accompanying drawings illustrate by way of example a preferred embodiment of a change speed box according to the invention. In said drawings:

Fig. 1 is a vertical cross-section of the casings enclosing the change speed box and the preselecting means.

Figs. 2 and 3 illustrate structural details.

Fig. 4 is a partial horizontal cross-section of the pre-selector case.

Fig. 5 is a side view of the locking means for the control lever.

Fig. 6 is a front view of the arrangement considered as a whole.

In Fig. 1, the preselector casing is illustrated at 1 and the casing of the change speed box at 2. The latter is provided with a driving shaft 3, with an intermediate shaft 4 and with a driven shaft 5.

To the shaft 3 which is driven by the motor M, are keyed the gear wheels 6, 7 and 8 having different diameters and adapted to mesh respectively with the gear wheels 9, 10 and 11 on the sliding gear 12 which latter may be fitted on the intermediate shaft 4 selectively in three different positions corresponding respectively to the higher speed, i.e. through engagement between the wheels 6 and 9, to the lower speed for which the wheels 7 and 10 are engaged and to the intermediate speed for which the wheels 8 and 11 mesh with each other.

The shaft 3 is provided at its upper end with a threaded section 13 the thread of which has a high pitch and cooperates with a nut 14 bearing when inoperative against the collar 15 on the shaft 3 (Fig. 2). The lower surface of the nut forms a castellated or toothed crown 16. A driving member 17 secured to a rod 18 sliding in parallelism with the shaft 3 is provided with a toothed sector 19 facing the toothed crown 16. The rod 18 is rigid with a lever 20 keyed to the same spindle 21 as the lever 22 controlling the change of speed. When the rod 18 is urged upwardly under the action of said levers 20 and 22, the toothed sector 19 on the driving member 17 engages the teeth on the nut 14 so as to hold the latter fast angularly. When the traction on the lever 22 is continued in the direction of the arrow, this produces henceforward an axial shifting of the nut and therethrough a rotation of the driving shaft 3 engaging said nut which is thus held against rotation.

A return spring 23 urges the driving member 17 back into its inoperative position for which the toothed sector 19 has entirely released the toothed crown 16 on the nut.

The spindle 21 (Figs. 4 and 5) carries at one end the control lever 22 and at its other end a locking lever 24. The armature 25 of an electromagnet 26 is subjected to the action of a spring 27 and is located in a manner such as will lock the lever 24 as long as the electromagnet is not energized. In contradistinction, when the electromagnet is energized, the armature compresses the spring 27 and releases the lever 24 and consequently the control lever 22.

The winding of the electromagnet 26 is series connected with a contact $c_1$ of a relay comprising three contacts $c_2$ respectively connected in series with the three phases of motor M. The coil C of this relay is connected in series with a contact 30, the object of which will be disclosed later, and with a switch $M_1$ of motor M. When no current is flowing through coil C, the contact $c_1$ is closed and the contacts $c_2$ are open; the electromagnet 26 is energized and armature 25 is retracted.

If the switch $M_1$ is put into its closing position, and if lever 24 closes contact 30, the coil C is energized, contact $c_1$ is opening and the armature 25 is moved to its locking position, shown in dotted lines in Fig. 5.

Under such conditions, the levers 22 and 24 cannot be moved while the motor M is driving shaft 3. In contradistinction, as soon as switch $M_1$ is opened and motor M stopped, due to the opening of the contacts $c_2$, the electromagnet 26 is energized, due to the closing of contact $c_1$ and the armature 25 takes its retracted position, releasing lever 24.

A switch 28 is also provided for preventing the untimely starting or reengagement of the driving motor. To this end, the lever 24 when locked engages a piston 29 and holds the switch contacts 30 closed. When the lever 24 is released, the lever 22 may be drawn in the direction of the arrow with a view to producing a change of speed, the piston 29 is urged towards the lever 24 by the spring 31 so as to open the switch 30, so that the circuit of the coil C is opened and the motor M cannot be started or let in the clutch by erroneous closing of the switch $M_1$. This hindering of the starting or letting in the clutch of motor M continues as long as the lever has not been moved back into the position for which lever 24 closes contact 30.

The preselecting system illustrated in Fig. 1 is of a known type and does not require more than a brief description. It includes a horizontal spindle 32 over which is revolubly fitted a disc 33 provided with a series of blind bores of different depths, of which two are shown at 34 and 35 for cooperation with the pistons 36 and 37. The latter act on the corresponding arms 38 and 39 of a lever 40 provided with three arms and pivotally mounted at 41. A rotation of the disc 33 allows bringing into registry with the pistons 36 and 37 two blind bores the depths of which are such that the arm 42 of the lever 40 may occupy one of the three different positions a, b, c. This arm 42 actuates a rod 43 and a driving member 44 adapted to act on the sliding gear 12 so as to make the latter occupy a corresponding position out of the three positions provided for it on the intermediate shaft 4, said positions corresponding as already mentioned to different speeds. It is also possible with the same disc 33 to control several levers 40 with a corresponding number of pistons so as to act on a plurality of sliding gears.

The turning of the disc 33 over the spindle 32 is controlled by the arms 45, 46 of the bent lever 20 secured to the spindle 21 (Fig. 4). When the control lever 22 is in its inoperative position, the disc 33 is held on the left hand end of the spindle 32 and releases the pistons 36 and 37. For this position, it is possible to provide for a preliminary selection of the speed desired for the next operation as obtained by turning the disc 33 by means of a knob 47 rigid with the spindle 32 and with a pointer 48 moving in front of an annular scale 49 indicating the different speeds which may be obtained.

What I claim is:

1. In a change speed box of the preselecting type including a driving shaft, a power unit controlling the latter and a lever controlling the operation of the box, the provision of a threaded section having a high pitch and forming part of the driving shaft, a nut engaging said threaded section, means adapted to shift said nut in a direction parallel with the axis of the shaft, means for preventing said nut from rotating to constrain the shaft to turn upon shifting of the nut and means controlled by the lever of the change speed box for producing operation of the nut shifting means.

2. A change speed box of the preselecting type including a driving shaft and a driven shaft carrying respectively a plurality of gear wheels having different pitches, the gears on the driven shaft being shiftable with respect to the gears on the driving shaft in order to vary the speed combinations by engagement of predetermined gears on said driving shaft with predetermined gears on said driven shaft, and controlling means adapted to shift said gears on said driven shaft, a power unit driving the driving shaft and a lever controlling the operation of the box through a movement out of its inoperative into its operative position with respect to said controlling means, the provision of a threaded section having a high pitch and forming part of the driving shaft, a nut engaging said threaded section and a transverse surface of which is castellated, a member adapted to engage said castellated surface and to shift said nut in a direction parallel with the axis of the driving shaft to constrain the latter to rotate during the axial shifting of the nut and means operatively connecting the lever of the change speed box with said nut shifting member to make the latter shift the nut whenever the lever is moved out of its inoperative position with respect to said controlling means.

3. A change speed box of the preselecting type including a driving shaft and a driven shaft carrying respectively a plurality of gear wheels having different pitches, the gears of the driven shaft being shiftable with respect to the gears on the driving shaft in order to vary the speed combinations by engagement of predetermined gears on said driving shaft with predetermined gears on said driven shaft, a power unit driving the driving shaft and a lever controlling the operation of the box through a movement out of its inoperative into its operative position with respect to said controlling means, the provision of a threaded section having a high pitch and forming part of the driving shaft, a nut engaging said threaded section and a transverse surface of which is castellated, a member adapted to engage said castellated surface and to shift said nut in a direction parallel with the axis of the driving shaft to constrain the latter to rotate during the axial shifting of the nut, means operatively connecting the lever of the change speed box with said nut shifting member, to make the latter shift the nut whenever the lever is moved out of its inoperative position with respect to said controlling means, and means urging said nut shifting member away from the castellations in the nut when the lever has returned into its inoperative position with respect to said controlling means.

4. A change speed box of the preselecting type including a driving shaft and a driven shaft carrying respectively a plurality of gear wheels having different pitches, the gears on the driven shaft being shiftable with respect to the gears on the driving shaft in order to vary the speed combinations by engagement of predetermined gears on said driving shaft with predetermined gears on said driven shaft, and controlling means adapted to shift said gears on said driven shaft, a power unit driving the driving shaft, and a lever controlling the operation of the box through a movement out of its inoperative into its operative position with respect to said controlling means, the provision of a threaded section having a high pitch and forming part of the driving shaft, a nut engaging said threaded section and a transverse surface of which is castellated, a member adapted to engage said castellated surface and to shift said nut in a direction parallel with the axis of the driving shaft to constrain the latter to rotate during the axial shifting of the nut, means operatively connecting the lever of the change speed box with said nut shifting member to make the latter shift the nut whenever the lever is moved out of its inoperative position with respect to said controlling means, locking means holding the lever in its inoperative position and means controlling the locking means and controlled by the operation of the power unit to be operated thereby together with the driving shaft.

5. A change speed box of the preselecting type, including a driving shaft and a driven shaft carrying respectively a plurality of gear wheels having different pitches, the gears on the driven shaft being shiftable with respect to the gears on the driving shaft in order to vary the speed combinations by engagement of predetermined gears on said driving shaft with predetermined gears on said driven shaft, and controlling means adapted to shift said gears on said driven shaft, a power unit driving the driving shaft, and a lever controlling the operation of the box through a movement out of its inoperative into its operative position with respect to said controlling means, the provision of a threaded section having a high pitch and forming part of the driving shaft, a nut engaging said threaded section and a transverse surface of which is castellated, a member adapted to engage said castellated surface and to shift said nut in a direction parallel with the axis of the driving shaft to constrain the latter to rotate during the axial shifting of the nut, means operatively connecting the lever of the change speed box with said nut shifting member to make the latter shift the nut whenever the lever is moved out of its inoperative position with respect to said controlling means, an electromagnet adapted to be shifted between its energized and disenergized condition in accordance with the inoperative and operative condition of the driving shaft driven by said power unit, and including a winding and an armature controlled by said winding to prevent for a given energized or disenergized condition of the latter any movement of the lever out of its inoperative position with respect to said controlling means.

6. A change speed box of the preselecting type, including a driving shaft and a driven shaft carrying respectively a plurality of gear wheels having different pitches, the gears on the driven shaft being shiftable with respect to the gears on the driving shaft in order to vary the speed combinations by engagement of predetermined gears on said driving shaft with predetermined gears on said driven shaft, and controlling means adapted to shift said gears on said driven shaft, a power unit driving the driving shaft, and a lever controlling the operation of the box through a movement out of its inoperative into its operative position with respect to said controlling means, the provision of a threaded section having a high pitch and forming part of the driving shaft, a nut engaging said threaded section and a transverse surface of which is castellated, a member adapted to engage said castellated surface and to shift said nut in a direction parallel with the axis of the driving shaft to constrain the latter to rotate during the axial shifting of the nut, means operatively connecting the lever of the change speed box with said nut shifting member to make the latter shift the nut whenever the lever is moved out of its inoperative position with respect to said controlling means and means controlled by the lever in its inoperative position with respect to said controlling means for preventing operation of the driving shaft as long as the lever is in said inoperative position.

7. A change speed box of the preselecting type including a driving shaft and a driven shaft carrying respectively a plurality of gear wheels having different pitches, the gears on the driven shaft being shiftable with respect to the gears on the driving shaft in order to vary the speed combinations by engagement of predetermined gears on said driving shaft with predetermined gears on said driven shaft and controlling means adapted to shift said gears on said driven shaft, a power unit driving the driving shaft, and a lever controlling the operation of the box through a movement out of its inoperative into its operative position with respect to said controlling means, the provision of a threaded section having a high pitch and forming part of the driving shaft, a nut engaging said threaded section and a transverse surface of which is castellated, a member adapted to engage said castellated surface and to shift said nut in a direction parallel with the axis of the driving shaft to constrain the latter to rotate during the axial shifting of the nut, means operatively connecting the lever of the change speed box with said nut shifting member to make the latter shift the nut whenever the lever is moved out of its inoperative position with respect to said controlling means, locking means holding the lever in its inoperative position, means controlling the locking means and controlled by the operation of the power unit to be operated thereby together with the driving shaft, a switch controlled by the lever when in its inoperative position with respect to said controlling means, and a circuit controlled by said switch and preventing operation of the power unit as long as the lever has left its said inoperative position.

References Cited in the file of this patent
UNITED STATES PATENTS

| | | |
|---|---|---|
| 2,241,677 | Sheldrick | May 13, 1941 |
| 2,252,042 | Sinclair | Aug. 12, 1941 |
| 2,429,160 | Helmstein et al. | Oct. 14, 1947 |
| 2,438,455 | Roeder et al. | Mar. 23, 1948 |
| 2,486,254 | Briskin et al. | Oct. 25, 1949 |
| 2,699,072 | Wrinkle | Jan. 11, 1955 |